United States Patent
Pan et al.

(10) Patent No.: US 11,227,369 B2
(45) Date of Patent: Jan. 18, 2022

(54) DATA RESTORING METHOD USING COMPRESSED SENSING AND COMPUTER PROGRAM PRODUCT

(71) Applicants: National Tsing Hua University, Hsinchu (TW); Advanced ACEBIOTEK CO., LTD., Hsinchu County (TW)

(72) Inventors: Ci-Ling Pan, Hsinchu (TW); Bo-Lin Jian, Taichung (TW); Anup Kumar Sahoo, Hsinchu (TW)

(73) Assignees: National Tsing Hua University, Hsinchu (TW); Advanced ACEBIOTEK CO., LTD., Hsinchu County (TW)

( * ) Notice: Subject to any disclaimer, the term of this patent is extended or adjusted under 35 U.S.C. 154(b) by 91 days.

(21) Appl. No.: 16/502,034

(22) Filed: Jul. 3, 2019

(65) Prior Publication Data

US 2020/0302581 A1 Sep. 24, 2020

(30) Foreign Application Priority Data

Mar. 21, 2019 (TW) .................. 108109669

(51) Int. Cl.
*G06T 5/00* (2006.01)
*G06T 5/20* (2006.01)
(Continued)

(52) U.S. Cl.
CPC ............... *G06T 5/20* (2013.01); *G06F 17/16* (2013.01); *G06T 5/001* (2013.01); *H04N 19/126* (2014.11)

(58) Field of Classification Search
CPC .. G06T 5/20; G06T 5/001; G06T 5/50; H04N 19/126; G06F 17/16
See application file for complete search history.

(56) References Cited

U.S. PATENT DOCUMENTS 9,373,159 B2 6/2016 Amroabadi et al.
9,645,377 B2 5/2017 Bosworth et al.
(Continued)

OTHER PUBLICATIONS

Wotao Yin, Stanley Osher, Donald Goldfarb, and Jerome Darbon: "Bregman Iterative Algorithms for l1-Minimization with Applications to Compressed Sensing", 2008, Society for Industrial and Applied Mathematics, SIAM J. Imaging Sciences, vol. 1, No. 1, pp. 143-168. (Year: 2008).*

(Continued)

*Primary Examiner* — Siamak Harandi
(74) *Attorney, Agent, or Firm* — JCIPRNET

(57) ABSTRACT

A data restoring method using compressed sensing and computer program product, the method includes (a) continuously measuring data for plural times to generate measurement results correspondingly, and processing the i-th measurement result using the compressed sensing, and starting to generate data matrix when times of measuring reaches a preset times of measurements N; (b) generating a first data matrix using the [(j+1)–N]th to the j—the measurements, and then generating a first restored data; (c) generating a second data matrix using the [(j+2)–N]th to the (j+1)—the measurements, and then generating a second restored data; (d) calculating an error between the first and the second restored data; (e) determining whether the error keeps constant for a predetermined number of times; (f) if not, repeating steps (c) to (e).

10 Claims, 3 Drawing Sheets

(51) Int. Cl.
*H04N 19/126* (2014.01)
*G06F 17/16* (2006.01)

(56) References Cited

U.S. PATENT DOCUMENTS

2015/0125061 A1* 5/2015 Holt .................. G06T 5/001
 382/132
2017/0270074 A1* 9/2017 Lin .................... H03M 7/30

OTHER PUBLICATIONS

Wai Lam Chan et al., "A single-pixel terahertz imaging system based on compressed sensing," Appl. Phys. Lett., vol. 93, Sep. 2008, pp. 1-3.

* cited by examiner

DATA RESTORING METHOD USING COMPRESSED SENSING AND COMPUTER PROGRAM PRODUCT

CROSS-REFERENCE TO RELATED APPLICATION

This application claims the priority benefit of Taiwan application serial no. 108109669, filed on Mar. 21, 2019. The entirety of the above-mentioned patent application is hereby incorporated by reference herein and made a part of this specification.

BACKGROUND

Technical Field

The present invention relates to a data restoration method using a compressed sensing and a computer program product.

Description of Related Art

Among the many methods for restoring original images or signals from measured or detected images, compressed sensing, also known as compressive sampling or sparse sampling, is a well-known image processing method. Compressed sensing is basically a technique for finding sparse solutions in underdetermined linear systems. The equation generally used in the application is expressed as shown in the following formula (1).

$$Y = \varphi \times X \qquad (1)$$

in which Y is an observed value, i.e., the detected signals or images. $\varphi$ is a sensing matrix, X is an original signal matrix. In the case of full rank, the matrix X can be solved directly by linear algebra.

However, under the underdetermined matrix, it cannot be solved directly. Therefore, there are related techniques using compressed sensing to find solutions in the underdetermined matrix. Although the solution can be found by using the compressed sensing, different methods have different characteristics, and therefore it is difficult to confirm whether the current restoration status is perfect if the original signal is required to be perfectly restored and the correct answer is not known.

The compressed sensing technology has existed and developed for many years. Nowadays it is mainly used in image and communication systems. However, there is not a method to quickly and correctly determine that the signal has been restored.

The single pixel imaging via compress sensing technology has developed to reconstruction of images with combination of spatial light modulator, especially in the terahertz frequency range.

SUMMARY

In view of above, according to one embodiment of the disclosure, a data restoration method using compressed sensing is provided. The data restoration method comprises: (a) continuously measuring data for plural times to generate measurement results correspondingly, and processing the i-th measurement result by using the compressed sensing, and when times of measuring reaches a preset times of measurements N, starting to generate a data matrix; (b) using the [(j+1)−N]-th measurement to the j-th measurement to generate a first data matrix, and generating a first restored data from the first data matrix, where j is a natural number and is greater than or equal to N; (c) using the [(j+2)−N]-th measurement to the (j+1)-th measurement to generate a second data matrix, and generating a second restored data from the second data matrix; (d) calculating an error between the second restored data and the first restored data; (e) determining whether the error is a preset error value and keeps constant for a predetermined number of times; and (f) returning to the step (c) to the step (e) if times of the error keeping constant is less than the predetermined number of times, until the error keeps constant for the predetermined number of times.

In the above data restoration method, the method further comprises: converting the measurement result into a row (or column) vector by using the compressed sensing.

In the above data restoration method, generating the first or the second restored data further comprises: decomposing the first or the second data matrix to generate a low rank matrix and a sparse matrix; solving the low rank matrix; averaging values of each row (or column) of the solved low rank matrix to form a row (column) vector; and generating the first or the second restored data from the row (or column) vector obtained from the low rank matrix.

In the above data restoration method, generating the first or the second data matrix further comprises: using the compressed sensing to generate a corresponding i-th row (or column) vector based on the i-th measurement result; and sequentially arranging N row (or column) vectors starting from the i-th row (or column) vector in a row (or column) direction to form the first or the second data matrix based on the preset times of measurements N.

In the above data restoration method, the predetermined error value can be zero. In addition, in the above data restoration method, the data can be a signal or an image.

According to another embodiment of the disclosure, a computer program product loaded to a computer to execute a program is provided. The program product executes a data restoration method using compression sensing, and the data restoration method includes: (a) continuously measuring data for plural times to generate measurement results correspondingly, and processing the i-th measurement result by using the compressed sensing, and when times of measuring reaches a preset times of measurements N, starting to generate a data matrix; (b) using the [(j+1)−N] measurement to the j-th measurement to generate a first data matrix, and generating a first restored data from the first data matrix, where j is a natural number and is greater than or equal to N; (c) using the [[j+2)−N] measurement to the (j+1)-th measurement to generate a second data matrix, and generating a second restored data from the second data matrix; (d) calculating an error between the second restored data and the first restored data; (e) determining whether the error is a preset error value and keeps constant for a predetermined number of times; and (f) returning to the step (c) to the step (e) if times of the error keeping constant is less than the predetermined number of times, until the error keeps constant for the predetermined number of times.

In the above computer program product, the method further comprising: converting the measurement result into a row (or column) vector by using the compressed sensing.

In the above computer program product, generating the first or the second restored data further comprises: decomposing the first or the second data matrix to generate a low rank matrix and a sparse matrix; solving the low rank matrix; averaging values of each row (or column) of the solved low rank matrix to form a row (or column) vector; and generating the first or the second restored data from the row (or column) vector obtained from the low rank matrix.

In the above computer program product, generating the first or the second data matrix further comprises: using the compressed sensing to generate a corresponding i-th row (or column) vector based on the i-th measurement result; and sequentially arranging N row (or column) vectors starting from the i-th row (or column) vector in a row (or column) direction to form the first or the second data matrix based on the preset times of measurements N.

According to the embodiment of the present disclosure, combined with the method of compressive sensing and the solution of the low rank matrix and the sparse matrix, the embodiment can be more efficient in determining whether the data has been perfectly restored, and the number of times of observing the measurements can be also significantly decreased. In addition, through this method, the characteristics of the low rank matrix can be used to more objectively determine that the data has been restored.

According to above configuration, one possible application is to reconstruct the images by using spatial light modulator, especially at the range of THz frequency. Advantageously, the mechanical scanning procedure is replaces via the algorithm and the image system can be faster to achieved high resolution reconstructed images.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
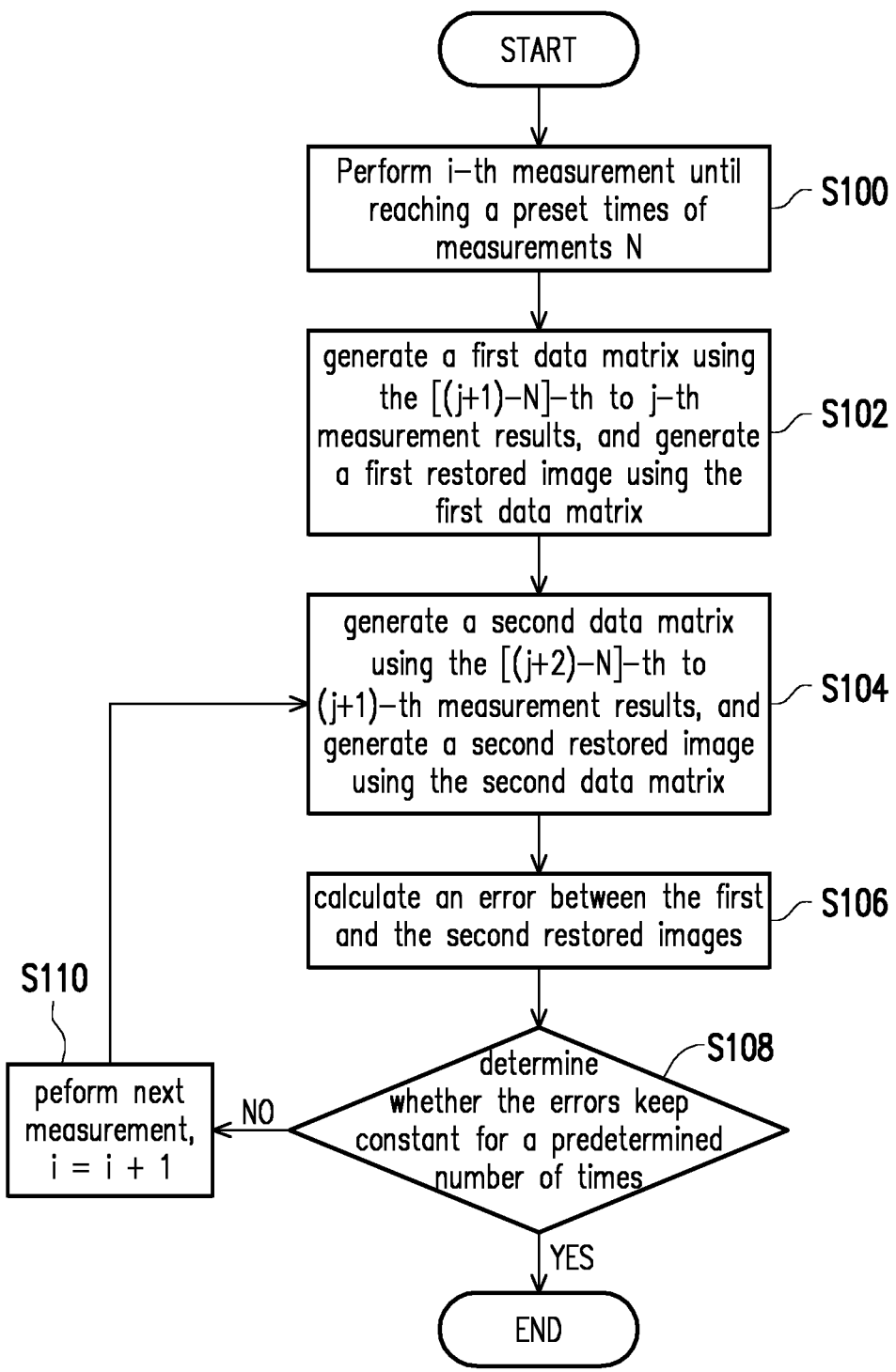
FIG. 1 is a schematic flow chart showing a compression sensing operation method according to the embodiment.

FIG. 1 is a schematic flow chart showing a compression sensing operation method according to the embodiment.

In step S100, the data is subjected to the i-th measurement (i is a natural number, i=1, . . . , n). The data can be a signal or an image. The following will use images as an example to describe. Furthermore, according to an embodiment of the present disclosure, a data matrix D is first generated from the measurement results, and therefore there must be sufficient data to construct the data matrix D. Therefore, before the method begins to execute, it is necessary to determine the size of the data matrix D to be established.

According to the embodiment, the size of the data matrix D depends on the processing capability of the processing system, and simply speaking, how large the buffer can be provided by the system. For convenient description, the present embodiment assumes that a predetermined number of measurement times is N. In this example, a predetermined times of measurement N is 10 as an example. In the embodiment, after each measurement, the measurement result is subjected to a compression sensing processing. The compressed sensing process can be any known compression sensing method.

Next, in Step S102, since the set predetermined times of measurement N is 10, the flow will first perform the first to tenth measurements (i.e., i=1 to 10), and use the measurement result to generate the data matrix D. Then, the data matrix D is used to generate a first restored image. Next, step S104 is executed to perform the eleventh measurement (i=11) on the data. At this time, the data of the first measurement made previously is removed, and the second to eleventh measurement results are used to generate a new data matrix D. The new data matrix D is then used to generate a second restored image. Therefore, the measurement result is stored based on the first in first out (FIFO) to update the data matrix D.

Next, in step S108, an error of the second restored image and the first restored image is calculated. In this method, a predetermined error value can be set, for example, can be set to zero. Therefore, in this example, step S108 determines how many times the error of the second restored image and the first restored image can be maintained at 0. In the implementation, the above times can be set to a preset times (for example, 10 times or other suitable times). When, the preset times for the error being 0 can be maintained for 10 times (Yes, S108), the process can be ended. Then, it can determine that the results of the measurements have restored the original image perfectly.

On the other hand, if the number of times that the error between the second restored image and the first restored image is maintained at 0 has not reached the predetermined number of times (No, S108), the flow proceeds to step S110 to start the next measurement, that is, the (j+1)-th measurement. Thereafter, returning to step S106, a new material matrix D is generated. When the error being 0 has not been continuously maintained for the predetermined number of times (in this example, 10 times), steps S106 to S110 are repeatedly performed.

In summary, the current restored image will use the [(j+2)−N]-th to (j+1)-th measurement results to generate the data matrix D, and the previous restored image will use the [(j+1)−N]-th to the j-th measurement results to generate the data matrix D, where j is a natural number greater than or equal to N. For example, the first restored image (considered as the previous restored image) is generated by using the first (=10+1−10) to the tenth measurement (j=10), the second (=11+1−10) restored image (considered as the current restored image) is generated by using the second to eleventh measurement results (j=11). Next, the error of the second and first restored images is calculated in step S108.

In the initial measurement phase, the error between the two restored images should not be zero, so the next measurement will be performed (i.e., in step S110, j=j+1=11+1=12), i.e., the twelfth measurement is performed. At this time, the flow returns to step S104, and according to the twelfth measurement result, a new data matrix D is generated by the third (=12+1−10)-th to the twelfth measurement results, and a new restored image is generated accordingly (referring to the second restored image at this time). In addition, there has been a restored image obtained by the second to eleventh measurement results in the previous error calculation (referring to the first restored image). This step will be continued repeatedly until the error between the second restored image and the first restored image is maintained at 0 for the predetermined number of times.

Figure 2:
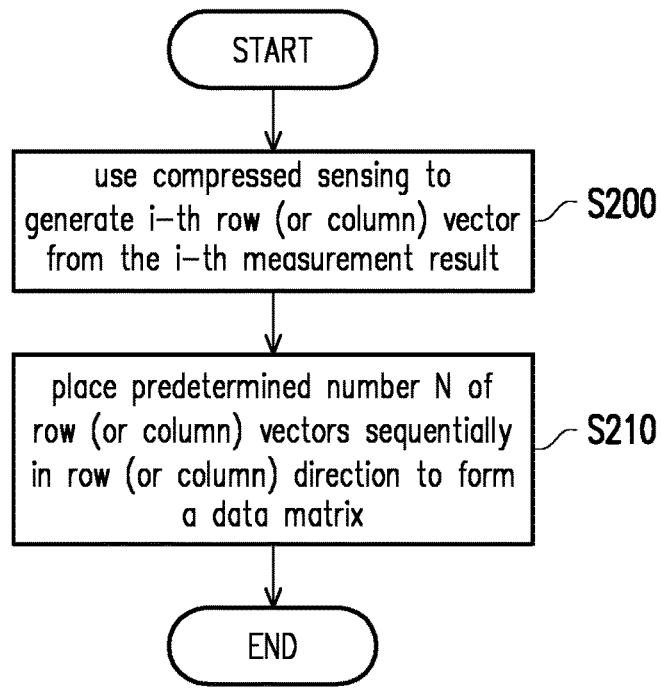
FIG. 2 is a flow chart showing the generation of a data matrix in accordance with the present embodiment.

FIG. 2 is a flow chart showing the generation of a data matrix in accordance with the present embodiment. According to the embodiment, one point is how to establish the data matrix D, use the data matrix D to solve the low rank matrix, and correctly restore the original image data. Therefore, a method of generating the data matrix D will be described below with reference to FIG. 2.

According to this embodiment, the dimension or size of the data matrix to be processed may be set first, that is, the number of measurements required to solve the data matrix. In the example of the above embodiment, 10 times of measurement data is used as a base. The following will take 10 times as an example, but in actual application, the size of the data matrix D (the number of measurements of the signal) can be set according to the actual situation. Therefore, in this example, the data matrix D is a matrix of 10×n.

As shown in FIG. 2, a method for generating the data matrix will be described. First, in step S200, the measurement result is restored using the compressed sensing method for each (i-th) measurement result. In this embodiment, the compressed sensing method can be any known compressed sensing method. As an example, the compressed sensing method can use the FOCUS S method (Z. Khalik and A. Gercekcioglu, "Heart Rate Monitoring Using PPG Signals", 2016). Then, after the measurement result is restored by the compressed sensing method, the restored data is further used to generate a one-dimensional row or column vector, for example, a vector of 1×n. Row vectors or column vectors may be employed in accordance with embodiments of the present invention. This embodiment will take the row vector as an example.

Next, in step S210, the data of the restored image represented by the one-dimensional vector obtained each time is sequentially placed at positions in the row of the data matrix D. For example, the data obtained after measuring signal at first time is calculated by using the compressed sensing method, and the obtained data (for example, there are n, that is, the restored data points of this measurement) is presented in a one-dimensional manner. For example, the row vector generated by the first measurement result is (A1, A2, . . . , An). This one-dimensional row vector is then placed in the first row of the data matrix D. Similarly, the row vector (B1, B2, . . . , Bn) obtained after measuring signal second time is placed in the second row of the data matrix D. The row vectors (C1, C2, . . . , Cn) obtained after measuring signal at the third time is placed in the third row of the data matrix D. Finally, the result of the tenth signal measurement is subjected to compression sensing calculation and the obtained row vector (X1, X2, . . . , Xn) is placed in the tenth row of the data matrix D. As a result, a data matrix D shown in the following formula (2) is constructed.

$$D = \begin{bmatrix} A_1 & A_2 & \cdots & \cdots & A_n \\ B_1 & B_2 & \cdots & \cdots & B_n \\ C_1 & C_2 & \cdots & \cdots & C_n \\ \vdots & \vdots & \vdots & \vdots & \vdots \\ X_1 & X_2 & \cdots & \cdots & X_n \end{bmatrix} \quad (2)$$

Similarly, when the eleventh measurement is performed, the eleventh row vector (Y1, Y2, . . . , Yn) is also generated. Then, according to the first-in first-out mode, the row vector (A1, A2, . . . , An) of the first row is removed and the eleventh row vector (Y1, Y2, . . . , Yn) is placed in the tenth row of the data matrix D. Thus, a new data matrix D is generated.

Figure 3:
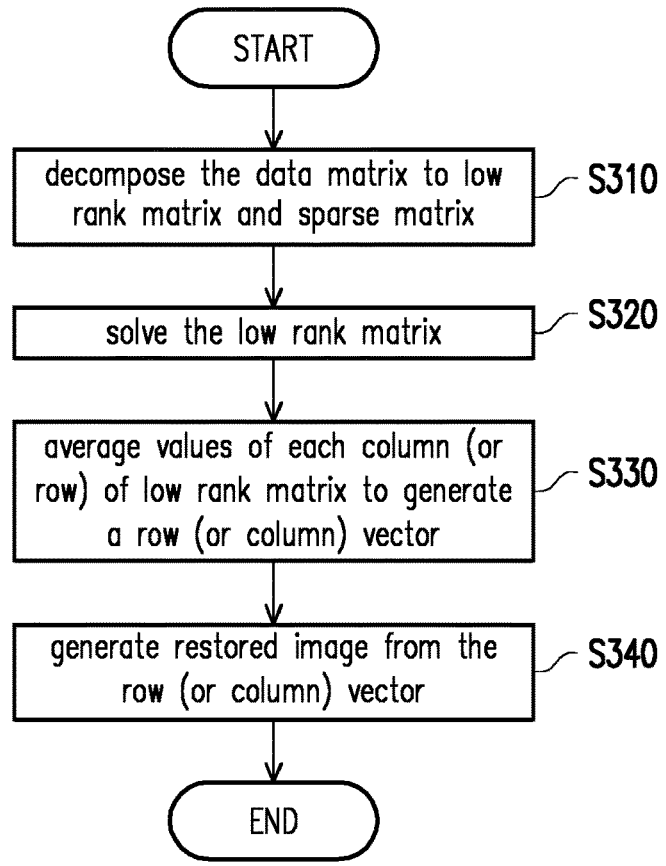
FIG. 3 is a schematic flow chart for obtaining a low rank matrix from a data matrix and producing a restored image.

The calculation method of the restored image will be described with reference to FIG. 3. As shown in FIG. 3, in step S310, the data matrix D obtained previously is decomposed into a low rank matrix A and a sparse matrix E as shown in the following formula (3). The decomposition method of data matrix D can be referred to any technology document on compressed sensing.

$$D = A + E \quad (3)$$

Next, in step S320, the low rank matrix A and the sparse matrix E are solved. The following description is one example and is not intended to limit the embodiments of the present disclosure. Basically, any method of computing a low rank matrix can be used. In order to find the characteristics of the low rank matrix A and the sparse matrix E, the formula can be transformed as the formula (4).

$$\min_{A,E}(\mathrm{rank}(A) + \lambda \|E\|_0) \quad (4)$$

The condition is limited to D=A+E, and $\lambda$ is a constant greater than zero. In order to simplify the calculation, for example, the formula is rewritten in a convex optimization manner, and the formula is as shown in the formula (5).

$$\min_{A,E}(\|A\|_* + \lambda \|E\|_0) \quad (5)$$

In order to find a minimum value of the above formula (5), the general method can use such as Accelerated Proximal Gradient (APG), Augmented Lagrange Multiplier (ALM), Alternating Direction Method (ADM) or inexact multiplier operator (inexact ALM). In this embodiment, the low rank matrix will be solved by the method proposed by Trigeorgis et al, this method solves non-negative matrix decomposition by deep semi-negative matrix decomposition (Deep Semi-NMF). (G. Trigeorgis, K. Bousmalis, S. Zafeiriou, and B. Schuller, "A deep semi-nmf model for learning hidden representations," in International Conference on Machine Learning, 2014, pp. 1692-1700). The calculation method is as shown in the following formula (6).

$$D \approx Z \times H \quad (6)$$

At this time, the low-dimensional representation of the original data is H, and Z is the base matrix. Therefore, the formula (6) can be rewritten as the following formulae (7) and (8).

$$A = Z \times H \quad (7)$$

$$E = D - A \quad (8)$$

At this time, the low rank matrix A and the sparse matrix E can be solved. Although the method of depth semi-non-negative matrix decomposition is used to solve the low rank matrix A and the sparse matrix E. However, other related methods can also be used to solve the low rank matrix A.

Then, in this embodiment, the restoration process is performed on the image by using the solved low rank matrix. The solved low rank matrix A is basically a two-dimensional matrix. In step S330, in the present embodiment the values of each column of the low rank matrix A are added and an average thereof is calculated. In this way, a one-dimensional row vector is finally formed. Next, in step S340, the restoration process on the image is performed by using the row vector obtained above to obtain a restored image. Thereafter, the flow of this embodiment returns to steps S104 and S106 of FIG. 1 and those steps are repeatedly executed.

It should be noted that, in this embodiment, the data matrix D is generated by using each measurement result to generate a one-dimensional row vector, and then generating row vectors of the predetermined number of times N (10 times in this embodiment). The ten row vectors are sequentially arranged to form the data matrix D. Therefore, during the process of restoring the image, in order to generate the row vector from the low rank matrix A, values in the column direction of the low rank matrix are averaged to generate a one-dimensional row vector. However, if the data matrix D is generated by arranging column vectors, that is, after each measurement, a one-dimensional column vector is generated by the compressed sensing, values in the row direction of the low rank matrix are averaged during the process of restoring images by using the low rank matrix A, so as to generate a one-dimensional column vector to restore the image.

Next, a verification will be made to demonstrate that the method of the present disclosure does indeed restore the original image efficiently and perfectly.

Figure 4A:
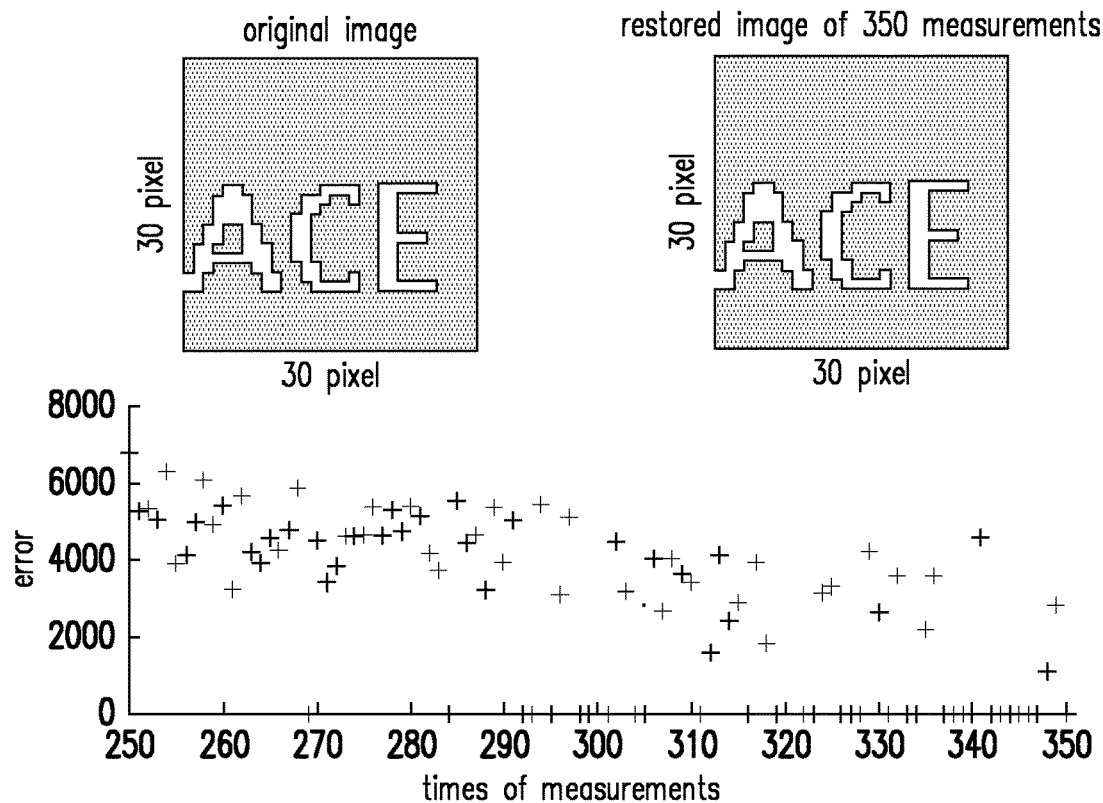
FIGS. 4A and 4B respectively show comparison results of restored images obtained by the conventional method and the method of the present embodiment.
Figure 4B:
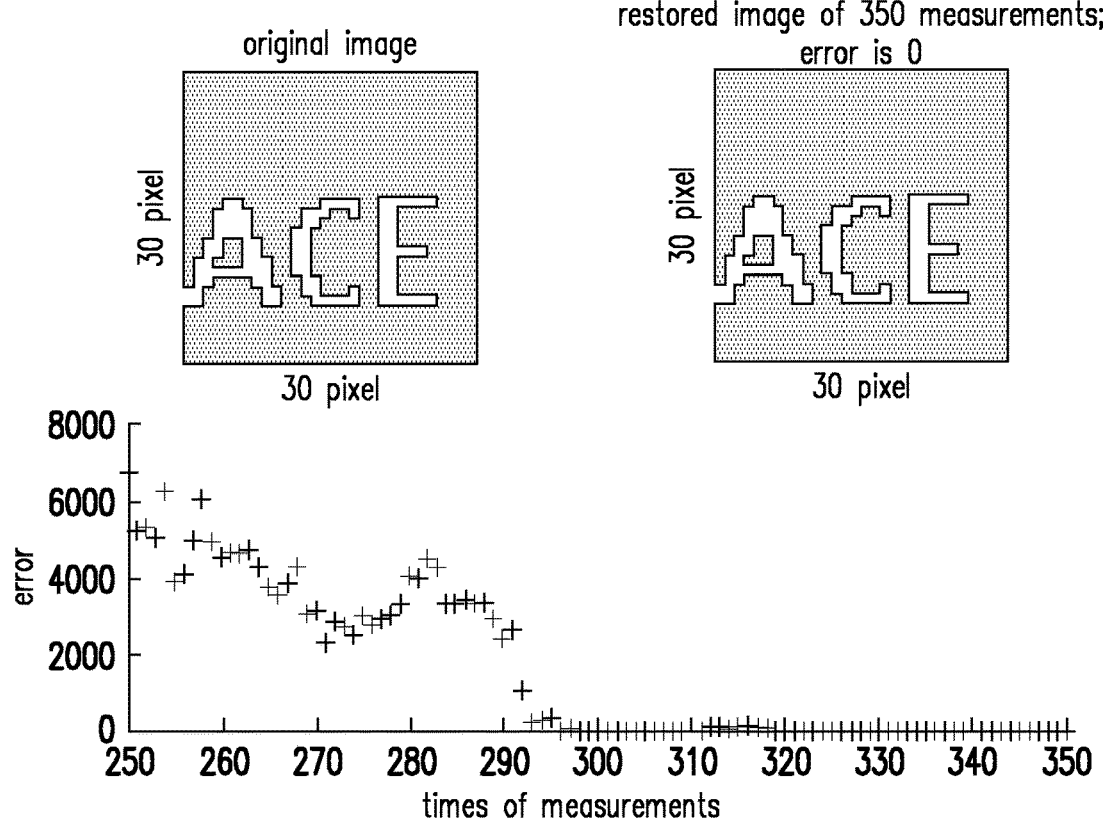

FIGS. 4A and 4B respectively show comparison results of restored images obtained by the conventional method and the method of the present embodiment. Both the conventional method and the method of the present embodiment are exemplified by an image having a pixel size of 30×30.

As shown in FIG. 4A, the conventional method is to perform the restoration of the measured image only using a general compression sensing method. When observing 250-350 measurements, it can be clearly seen that the error of the restored image still does not approach zero. The error distribution is in a dispersed state. This result means that the restored image still differs from the original image and is not perfectly restored to the original image. In addition, according to the result of FIG. 4A, by the conventional processing method only using the compressed sensing method, it needs to measure more times so as to make the calculated error with respect to the original image approach zero, i.e., it needs more times to measure to perfectly restore the original image and the efficiency is worse.

Further, as shown in FIG. 4B, under the same conditions, the present embodiment combines the process of the low rank matrix and the sparse matrix in addition to the general compression sensing process. Therefore, for the number of times of measurements, it can be clearly seen that when the number of times of measurements is close to 300, the error calculated by the restored image and the original image has reached zero, and the subsequent measurement results also show that the error of the restored image keeps remaining around zero.

In addition, the embodiment can also be used as a computer program product, and the data restoration method using the compressed sensing described in FIG. 1 to FIG. 3 is executed through the computer.

Therefore, according to the present embodiment, in combination with the compression sensing and the process of the low rank matrix and the sparse matrix, the number of times of the measured image that is perfectly restored to the original image can be effectively reduced, and the efficiency of the image processing can be greatly improved.

In summary, according to the embodiment of the present disclosure, combined with the method of compressive sensing and the solution of the low rank matrix and the sparse matrix, the embodiment can be more efficient in determining whether the data has been perfectly restored, and the number of times of observing the measurements can be also significantly decreased. In addition, through this method, the characteristics of the low rank matrix can be used to more objectively determine that the data has been restored.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A data restoration method using compressed sensing and performed by a processor, comprising:
    (a) continuously measuring data for plural times by a measuring device to generate measurement results correspondingly, and processing the i-th measurement result by using the compressed sensing, and when times of measuring reaches a preset times of measurements N, starting to generate a data matrix, wherein the measurement results are sequentially stored in a FIFO (first in first out) that is operated with the processor and the processor is configured to read the measurement results and set each of the measurement results as a row vector or a column vector of the data matrix;
    (b) using the [(j+1)−N]-th measurement result to the j-th measurement result to generate a first data matrix, and generating a first restored data from the first data matrix by using the compressed sensing, where j is a natural number and is greater than or equal to N, wherein the processor is configured to set each of the measurement results from the [(j+1)−N]—the measurement result to the j-th measurement result as a row vector or a column vector of the first data matrix;
    (c) using the [(j+2)−N]-th measurement result to the (j+1)-th measurement result to generate a second data matrix, and generating a second restored data from the second data matrix by using the compressed sensing, wherein the processor is configured to set each of the measurement results from the [(j+2)−N]—the measurement result to the (j+1)—the measurement result as a row vector or a column vector of the first data matrix;
    (d) calculating an error between the second restored data and the first restored data;
    (e) determining whether the error is a preset error value and keeps constant for a predetermined number of times; and
    (f) returning to the step (c) to the step (e) if times of the error keeping constant is less than the predetermined number of times, until the error keeps constant for the predetermined number of times.

2. The data restoration method according to claim 1, further comprising: converting the measurement result into the row (or column) vector by using the compressed sensing.

3. The data restoration method according to claim 1, wherein generating the first or the second restored data further comprises:
    decomposing the first or the second data matrix to generate a low rank matrix and a sparse matrix;
    solving the low rank matrix;
    averaging values of each row (or column) of the solved low rank matrix to form a row (column) vector; and
    generating the first or the second restored data from the row (or column) vector obtained from the low rank matrix.

4. The data restoration method according to claim 1, wherein generating the first or the second data matrix further comprises:

using the compressed sensing to generate a corresponding i-th row (or column) vector based on the i-th measurement result; and sequentially arranging N row (or column) vectors starting from the i-th row (or column) vector in a row (or column) direction to form the first or the second data matrix based on the preset times of measurements N.

5. The data restoration method according to claim 1, wherein the predetermined error value is zero.

6. The data restoration method using compressed sensing according to claim 1, wherein the data is a signal or an image.

7. A non-transitory computer-readable medium that stores a program, and the program being loaded to a computer to execute a data restoration method using compression sensing that is performed by a processor of the computer, and the data restoration method includes:
(a) continuously measuring data for plural times by a measuring device to generate measurement results correspondingly, and processing the i-th measurement result by using the compressed sensing, and when times of measuring reaches a preset times of measurements N, starting to generate a data matrix, wherein the measurement results are sequentially stored in a FIFO (first in first out) that is operated with the processor and the processor is configured to read the measurement results and set each of the measurement results as a row vector or a column vector of the data matrix;
(b) using the [(j+1)–N] measurement result to the j-th measurement result to generate a first data matrix, and generating a first restored data from the first data matrix by using the compressed sensing, where j is a natural number and is greater than or equal to N, wherein the processor is configured to set each of the measurement results from the [(j+1)–N]—the measurement result to the j-th measurement result as a row vector or a column vector of the first data matrix;
(c) using the [[j+2)–N] measurement result to the (j+1)-th measurement result to generate a second data matrix, and generating a second restored data from the second data matrix by using the compressed sensing, wherein the processor is configured to set each of the measurement results from the [(j+2)–N]—the measurement result to the (j+1)—the measurement result as a row vector or a column vector of the first data matrix;
(d) calculating an error between the second restored data and the first restored data;
(e) determining whether the error is a preset error value and keeps constant for a predetermined number of times; and
(f) returning to the step (c) to the step (e) if times of the error keeping constant is less than the predetermined number of times, until the error keeps constant for the predetermined number of times.

8. The non-transitory computer-readable medium of claim 7, further comprising: converting the measurement result into the row (or column) vector by using the compressed sensing.

9. The non-transitory computer-readable medium of claim 7, wherein generating the first or the second restored data further comprises:
decomposing the first or the second data matrix to generate a low rank matrix and a sparse matrix;
solving the low rank matrix;
averaging values of each row (or column) of the solved low rank matrix to form a row (or column) vector; and
generating the first or the second restored data from the row (or column) vector obtained from the low rank matrix.

10. The non-transitory computer-readable medium of claim 7, wherein generating the first or the second data matrix further comprises:
using the compressed sensing to generate a corresponding i-th row (or column) vector based on the i-th measurement result; and
sequentially arranging N row (or column) vectors starting from the i-th row (or column) vector in a row (or column) direction to form the first or the second data matrix based on the preset times of measurements N.

* * * * *